Dec. 1, 1931.  C. C. CADDEN  1,834,573
CALENDERING METHOD AND APPARATUS
Filed May 11, 1928   2 Sheets-Sheet 1
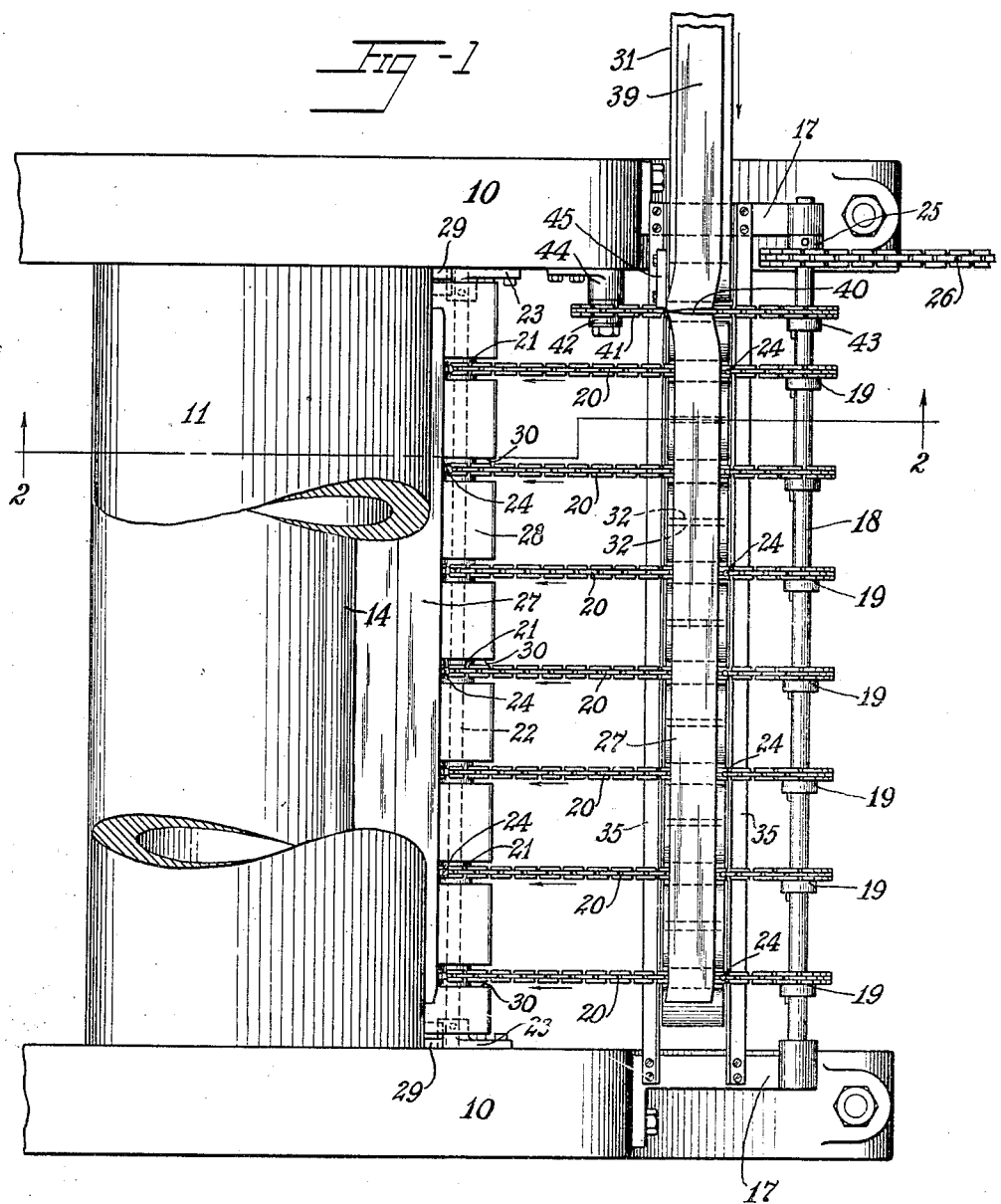
Inventor
Charles C. Cadden
By Pierson, Eakin & Avery
Attys.

Dec. 1, 1931.        C. C. CADDEN        1,834,573
CALENDERING METHOD AND APPARATUS
Filed May 11, 1928    2 Sheets-Sheet 2
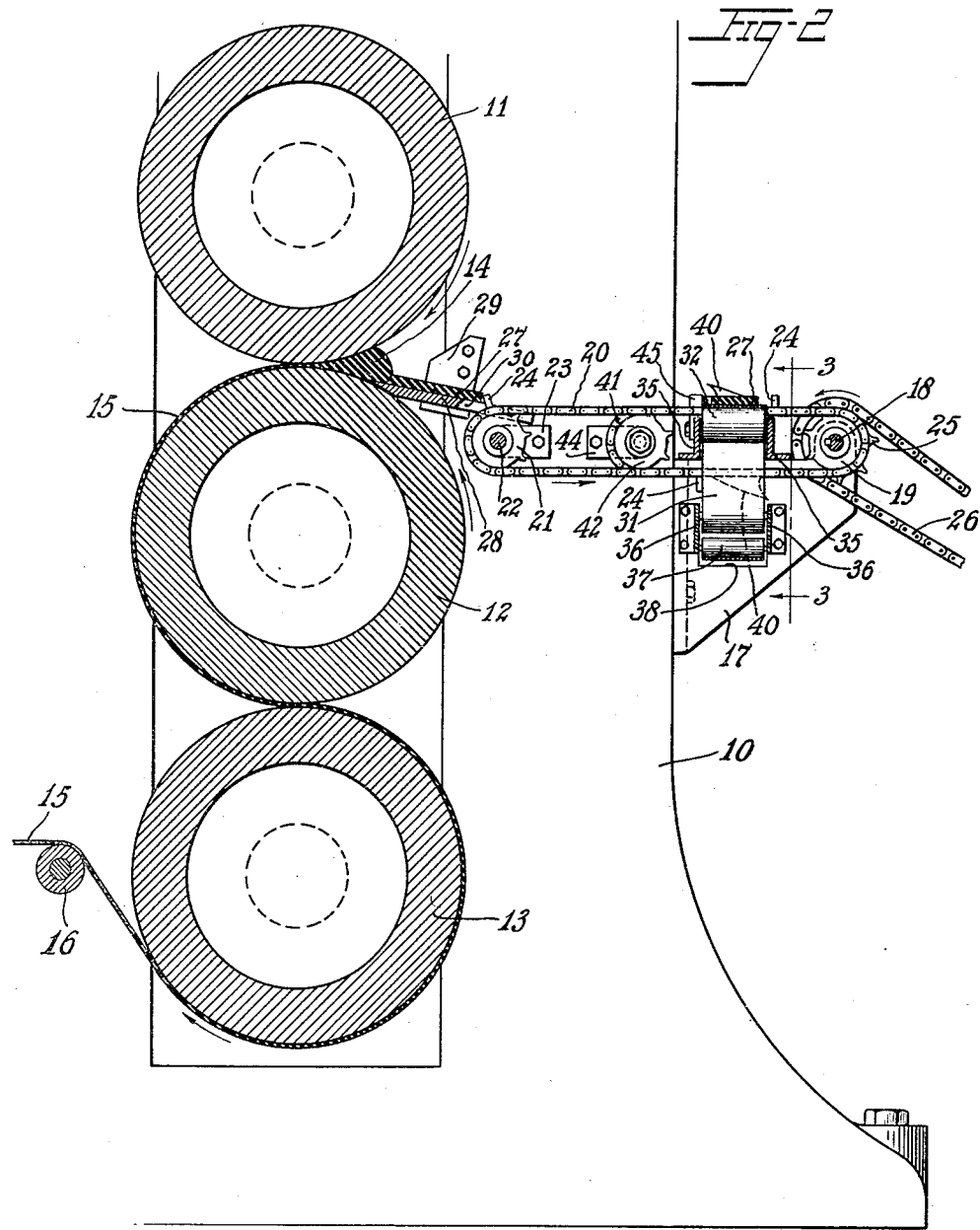
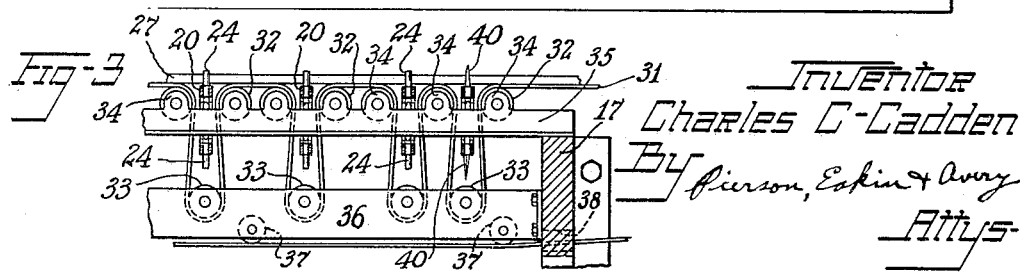

Patented Dec. 1, 1931

1,834,573

UNITED STATES PATENT OFFICE

CHARLES C. CADDEN, OF AKRON, OHIO, ASSIGNOR TO THE B. F. GOODRICH COMPANY, OF NEW YORK, N. Y., A CORPORATION OF NEW YORK

CALENDERING METHOD AND APPARATUS

Application filed May 11, 1928. Serial No. 276,855.

This invention relates to calenders such as are used in the rubber industry for forming thin sheets of unvulcanized rubber or for applying a coating of unvulcanized rubber to one or both sides of lengths of fabric, and especially it relates to procedure and apparatus for feeding batches of warm, plastic, unvulcanized rubber composition or the like into a calender.

In the calendering of rubber sheets and the rubberizing of fabric considerable difficulty has been experienced in obtaining a product of accurate and uniform thickness. Many expedients have been proposed for improving the operation of the calender in this respect, most of them involving the use of a gauge for quickly detecting and recording variations in the thickness of the sheeted stock so that the calender rolls can be automatically or manually adjusted to bring the stock back to proper gauge.

Such expedients, while helpful, are effective to correct the situation only after it has continued for a time, and the readjustment of the calender rolls is not permanently effective, because the variations of gauge are caused by various factors such as variations in the temperature and plasticity of the bank of stock, which in turn may vary according to the amount of stock in the bank and the manner in which stock is added to the bank.

In fact applicant has found that most of the irregularity in the gauge of sheeted rubber has been caused by the manner in which the rubber has been fed to the calender, the stock usually having been fed by adding a lump or roll of the rubber composition to the bank by hand at irregular intervals and at various places in the bank according to the operator's discretion. The result is a bank of stock of varying thickness throughout its length and widely varying in quantity from time to time. Prior to my invention stock has been fed to the calender by apparatus comprising a slowly oscillating conveyor which lays a continuous strip of the rubber composition back and forth upon the bank of stock in the calender, but such apparatus does not give the high degree of uniformity in the bank which is necessary for entirely satisfactory results.

The general object of this invention is to produce calendered sheets of rubber of uniform thickness. More specific objects are to maintain a uniformly distributed bank of stock in the calender and to maintain such a bank of stock at a substantially constant volume, and, in the attainment of these objects, to provide simple and inexpensive procedure and apparatus for feeding into the bank of stock in the calender, at frequent regular intervals, determinate, uniform quantities of stock and so feeding each increment of stock that it will be uniformly distributed along the length of the bank.

Of the accompanying drawings:

Fig. 1 is a plan view of apparatus embodying and adapted to carry out my invention in its preferred form, parts being in section and broken away.

Fig. 2 is a section on line 2—2 of Fig. 1.

Fig. 3 is a section on line 3—3 of Fig. 2.

Referring to the drawings, 10, 10 are the end frames and 11, 12 and 13 the respective rolls of a three-roll rubber-working calender, a bank of plastic, unvulcanized rubber stock 14 being shown in the bight of the two upper rolls 11, 12. The calender rolls are driven in the directions indicated by the arrows in Fig. 2 to form a sheet of stock 15, which, after passing around the lower roll 13 and over a guide-roll 16, passes from the calender to be wrapped in a liner or otherwise utilized.

Mounted upon the edge faces of the calender frames 10 and extending outwardly from the calender are respective brackets 17, 17, each of which is formed with a journal for the respective end of a horizontal shaft 18. Mounted upon the shaft 18 are a plurality of spaced-apart sprockets 19, 19 which are connected by respective sprocket chains 20, 20 with sprockets 21, 21 journaled upon a stationary shaft 22 which is supported from its end portions in brackets 23, 23 mounted upon the inner faces of the respective calender frames 10, the shaft 22 being positioned parallel to and adjacent the roll 12 and a little below the bank of stock 14. Each sprocket chain 20 is provided with a plurality of equally-spaced special links which comprise outwardly extending lugs 24, 24, and the lugs of the several chains are disposed in transverse alignment. The shaft 18 also is provided with a sprocket 25 by which it is driven, by the sprocket chain 26, from any convenient source of power. The chains 20 are adapted to receive a slab of rubber composition such as the slabs 27 and convey the same to the bank of stock 14 in the calender.

For receiving the slabs 27 from the chains 20, I provide an inclined shelf 28 which is supported from its ends upon brackets 29, 29 secured to the inner faces of the respective calender frames 10. Said shelf has its forward margin beveled so as to rest upon or closely adjacent the surface of the calender roll 12 immediately below the stock-bank 14, and has its rear marginal portion formed with indentations or slots 30, 30 which accommodate the respective sprocket chains 20 so that the rear margin of the shelf is below the plane of the upper reaches of said chains. The arrangement is such that successive slabs 27 carried by the chains 20 will pass onto the shelf 28 and be urged toward the stock-bank 14 by the studs 24 of the chains.

For bringing the slabs of stock 27 to the calender and into position to be engaged by the studs 24 of the chains 20, I provide an endless conveyor belt 31 which has its upper reach suitably arranged in loops or festoons so as to pass beneath the respective chains 20 but to travel in a plane slightly above the upper reaches of the chains in the regions between them.

The upper reach of the conveyor belt 31 is supported upon a series of idler rollers 32, 32 positioned between the chains 20, and a series of similar rollers 33, 33 (Fig. 3) positioned beneath the respective chains 20 in the festoons of the belt. The rollers 32 are journaled in respective pairs of upstanding ears 34, 34 formed on a pair of parallel supporting plates 35, 35 which are supported at their ends upon the brackets 17, and between said brackets are disposed between the upper and lower reaches of the several chains 20. The rollers 33 are journaled in a pair of parallel supporting plates 36, 36 which are supported at their ends by the brackets 17, the plates 36 being parallel to the plates 35 and at a lower position, beneath the chains 20. The plates 36 also provide journals for a series of guide-rollers 37, 37 for the lower reach of the conveyor belt 31, and one of the brackets 17 is formed with an aperture 38 through which said lower reach may pass on its way to a driving pulley (not shown) which conveniently may be located at the station where the slabs 27 are placed on the belt.

Although the slabs 27 may be brought to the calender as separate units, I prefer to bring them there as a part of a continuous strip of slab stock 39, and then to sever the latter to provide the individual units 27. The severing is effected at the stock-receiving side of the calender after the leading end of the strip has passed substantially to the opposite side of the calender, so that the severed slab 27 will extend from end to end of the stock-bank 14 when fed thereinto.

For severing the strip 39 at intervals a series of spur-shaped knives 40, 40 are mounted at equi-distant points upon a sprocket chain 41, the latter being mounted upon a pair of sprockets 42, 43. The sprocket 42 is journaled upon a bracket 44 secured to the inner face of one of the calender frames 10, and the sprocket 43 is mounted upon the driven shaft 18. The arrangement is such that the sprocket chains 41 and 20 are disposed in the same horizontal planes, and although the chain 41 is shorter than the chains 20, the knives 40 are so disposed with relation to the studs 24 of the several chains 20 that a row of the studs will engage the lateral margin of each successive slab 27 as soon as one of the knives 40 completes the separation of the slab from the strip 39. A shear-block 45 is mounted upon one of the plates 35 on one side of the orbit of the knives 40 to coact with the latter in the cutting operation.

In the operation of the apparatus, the continuous strip of slab stock 39 is brought to the calender upon the conveyor 31 and carried over the sprocket chains 41, 20 to the far side of the calender, the rigidity of the strip being sufficient to cause its leading end to pass over the sprocket chains where it is unsupported by the conveyor belt 31. The shaft 18 is driven by the sprocket chain 26 to drive the sprocket chains 20, 41 which carry the studs 24 and knives 40 respectively, and the speeds of the belt 31 and chains 20, 41 are so synchronized that the leading end of the strip 31 will travel substantially to the far side of the calender during the interval between the passing of one of the knives 40 from the cutting station and the arrival of the succeeding knife.

During the interval that the knife 40 is passing through the strip 39 the latter may buckle somewhat on the conveyor as it is forced against the knife but this is not detrimental since the resilience of the stock forces it to a flattened condition as soon as the knife has passed. However, the conveyor belt 31 may be driven intermittently so that the strip 39 will be stationary while being cut, or other expedients, such as mounting the knives to cut obliquely through the strip, may be employed to avoid buckling of the slab strip upon the conveyor.

As soon as the slab 27 is severed from the strip 39 it is engaged by the studs 24 of the chains 20 and fed toward the calender rolls, and passes from the chains onto the shelf 28 below the stock bank 14 in the bight of the calender rolls 11, 12. Succeeding slabs deposited on the shelf 28 force previously deposited slabs into said stock bank.

The delivery of the slabs 27 to the calender is timed to correspond, as nearly as is possible, to the output of the calender as represented by the calendered sheet 15, with the result that the stock-bank 14 is maintained at substantially constant volume, and by the feeding of fresh stock into the bank 14 uniformly throughout its length the bank is kept uniformly distributed and a calendered sheet 15 of uniform thickness is obtained.

My invention may be modified within the scope of the appended claims.

I claim:

1. The method of calendering rubber which comprises feeding a continuous strip of rubber composition to a position where its leading end portion is transversely aligned with the bank of stock in the calender, severing said leading end portion to produce a slab of the same length as the bank of stock, and then feeding the severed slab laterally into the bank of stock.

2. A method as defined in claim 1 in which the several operations are so timed and the strip of stock is of such size that the bank of stock is kept at substantially the same size.

3. Calendering apparatus comprising the combination of a calender and means for periodically replenishing the stock-bank therein uniformly throughout the entire length of the stock-bank so as to maintain the latter in substantially constant quantity and uniform distribution.

4. Calendering apparatus comprising the combination with a calender of means for feeding slabs of stock laterally into the bank of stock in said calender at timed intervals corresponding to the output of the calender.

5. Calendering apparatus comprising the combination with a calender of means for positioning slabs of stock in succession adjacent to the calender, and means for effecting lateral movement of the slabs to feed them into the stock-bank in the calender at periodic intervals corresponding to the output of the calender.

6. Calendering apparatus comprising the combination with a calender of means for feeding a continuous strip of rubber composition to the calender, means for periodically severing the leading end-portion thereof to produce a slab, of the same length as the stock-bank in the calender and means for feeding the severed slab into the bank of stock in the calender to replenish the latter uniformly throughout its entire length.

7. Calendering apparatus as defined in claim 6 in which continuous strip of stock is fed longitudinally and the severed slab is fed laterally.

8. Calendering apparatus comprising the combination with a calender of a belt conveyor for bringing slabs of stock to the calender, a plurality of chain-conveyors positioned over said belt conveyor and movable transversely thereto, and means on said chain conveyors for removing the slab of stock from the belt conveyor for delivery into the stock-bank of the calender at periodic intervals corresponding to the output of the latter.

9. Calendering apparatus comprising the combination with a calender of a belt conveyor for delivering a continuous strip of stock to a position adjacent the calender, means for periodically severing the leading end of the strip to produce a slab of the same length as the stock-bank to replenish the same concurrently throughout its entire length, and means operating in timed relation to the severing means for removing the severed slab of stock from the conveyor and feeding it into the calender.

10. Calendering apparatus comprising the combination with a calender of conveyor mechanism for feeding a slab of stock to the calender and means operating in timed relation to the output of the calender for removing the slab from said conveyor mechanism and directing it into the bank of stock in the calender.

11. Conveyor apparatus comprising in combination a belt conveyor having its upper reach disposed in a plurality of loops or festoons, respective transverse conveyors disposed transversely of said belt and positioned in said festoons below the carrying surface thereof, means on said transverse conveyors for periodically engaging work on the belt conveyor and moving it onto the transverse conveyors, and means for severing work upon the belt conveyor in timed relation to the operation of the work removing means.

In witness whereof I have hereunto set my hand this 4th day of May, 1928.

CHARLES C. CADDEN.